(12) United States Patent
Chen et al.

(10) Patent No.: US 6,574,576 B2
(45) Date of Patent: Jun. 3, 2003

(54) EQUALIZER WITH AUTO-CALIBRATION AND SELF-TEST

(75) Inventors: Chi-Ming Chen, Hsin-Chu (TW); Pi-Fen Chen, Pan-Chiao (TW)

(73) Assignee: Macronix International Co., Ltd. (TW)

( * ) Notice: Subject to any disclaimer, the term of this patent is extended or adjusted under 35 U.S.C. 154(b) by 0 days.

(21) Appl. No.: 09/823,993

(22) Filed: Apr. 3, 2001

(65) Prior Publication Data

US 2002/0143485 A1 Oct. 3, 2002

(51) Int. Cl.$^7$ .............................................. G01R 35/00
(52) U.S. Cl. ......................................... 702/107; 333/18
(58) Field of Search ............................. 702/107; 333/18

(56) References Cited

U.S. PATENT DOCUMENTS 5,818,378 A  *  10/1998  Cheng et al. .................. 333/18
5,940,441 A  *  8/1999   Cranford et al. .............. 333/18

* cited by examiner

Primary Examiner—John Barlow
Assistant Examiner—Anthony T. Dougherty

(57) ABSTRACT

In the present invention, a transmission line length estimation circuit with continuous feedback equalizer is provided. The transmission line length estimation circuit comprises a DC bias circuit and a peak detector circuit to generate a DC voltage according to a different cable length. An equalizer core circuit is for receiving the first signal and generating a second signal. A peak detector circuit is used for the first signal and the second signal. A transmission line length detector circuit is coupled to the peak detector circuit and used for generating a plurality of first parameters for phase shift and amplitude losses according to the different cable length. An internal pattern calibration circuit is multiplexed to the first signal and used for generating a plurality of second parameters for calibration of close loop. A feedback control circuit is connected to the equalizer core circuit and used for continuously fine tuning of the equalizer core circuit according to the first parameters and the second parameters.

11 Claims, 3 Drawing Sheets

EQUALIZER WITH AUTO-CALIBRATION AND SELF-TEST

BACKGROUND OF THE INVENTION

1. Field of the Invention

The invention relates to an equalizer, and more particularly to an equalizer with auto-calibration and self-test.

2. Description of the Prior Art

As generally know in the art of data communications systems, when a transmission medium such as a transmitter sends analog or digital signals over a transmission medium such as a transmission line or cable to a receiver, the received signals may become distorted due to attenuation and phase delay resulting when the signals are transmitted through the transmission line.

For example, a 100BaseT Ethernet receiver (following the Ethernet standard ANSI/IEEE Std. 802.3u) at the rate of 125 megabits per second. However, bit error rate for such as Ethernet receiver is related to signal distortion introduced to a received signal by a transmission line, and such distortion will vary depending on the length of transmission line utilized. A signal can be provided to an Ethernet receiver which follows the Ethernet standard ANSI/IEEE Standard 802.3u through a transmission line which may have one of several different lengths. In order to compensate for the signal distortion introduced by a transmission line, signals are typically corrected before being provided to an Ethernet receiver by passing the signals through an equalizer circuit which makes corrections to the input signal for amplitude losses and phase delay introduced by a transmission line.

A typical equalizer circuits include a compensating filter which restores amplitude and phase delay to a signal caused by a cable by having a gain and phase shift controlled by a received control signal. The control signal is typically provided by circuitry utilizing feedback form the equalizer.

A control circuit using feedback from an equalizer uses a set of high-pass basis functions that may be weighted and summed. By adjusting the weights, the compensating circuit can be adapted to accurately control the equalizer to compensate for distortion caused by various cable lengths. These fixed weighting terms for a particular cable length are typically set by a ratio of resistances coupled to the equalizer output. The structure assumes that the variations of the RC time constant controlled by varying the resistances will be roughly equivalent to a shift in RC time delay resulting from a cable length, and the assumption will apply as long as the ratios of resistances remain fairly constant over process. Although this technique is satisfactory for some cable lengths, the weights are difficult to control to accurately compensate for all the different cable length.

Referring to FIG. 1, a conventional equalizer 100 comprises an automatic gain control (AGC) circuit 130, an analog to digital (A/D) converter 140, digital adaptive equalizer 170(equalizer core), timing recovery 150 and an automatic gain control loop 160. The intensity of a received signal Vs is adjusted by the AGC circuit 130 and then converted a received digital signal by the A/D converter 140. The digital adaptive equalizer 170 adjusts the phase of the received digital signal to a received equalized signal Ve. The AGC circuit 130 and the A/D converter 140, coordinated with the AGC loop 160 and the timing recovery 150, are for use of intensity adjustment of the various received signals, while the digital adaptive equalizer 170 is for use of distortion compensations for the various frequencies. Such a conventional equalizer adjusts the gain and phase of the received signal at different time.

However, existing equalizer needs one ADC and digital equalizer. Additionally, the adjustments of the gain and phase for the received signal are implemented at two different stages.

SUMMARY OF THE INVENTION

It is an object of the present invention to provide an initialization circuit with continuous feedback equalizer. A feedback control circuit provides continuous auto-calibration for an equalizer core circuit.

It is another object of the present invention to provide a transmission line length estimation circuit capable to implement auto-calibration and self-test. The self-test steps with a pattern generator circuit can reduce problem of the calibration difficulty.

In the present invention, a transmission line length estimation circuit with continuous feedback equalizer is provided. The transmission line length estimation circuit comprises a DC bias current and peak detector circuit to generate a DC voltage according to different cable length. An equalizer core circuit is for receiving a first signal and generating a second signal. The peak detector circuit is used for the first signal and the second signal in the different time. A transmission line length detector circuit is coupled to the peak detector circuit and used for generating a plurality of first parameters for phase shift and amplitude losses according to different cable length. An internal pattern calibration circuit is multiplexed to the first signal and used for generating a plurality of second parameters for calibration of close loop. A feedback control circuit is connected to the equalizer core circuit and used for continuously fine tuning of the equalizer core circuit according to the first parameters and the second parameters

BRIEF DESCRIPTION OF THE DRAWINGS

A better understanding of the invention may be derived by reading the following detailed description with reference to the accompanying drawing wherein.

DESCRIPTION OF THE PREFERRED EMBODIMENT

In the present invention, an equalizer with auto calibration and self test is provided. The transmission line length estimation circuit comprises a DC bias circuit and a peak detector circuit to generate a DC voltage according to different cable length. An equalizer core circuit is used for receiving a first signal and generating a second signal. The peak detector circuit is used for the first signal and the second signal. A transmission line length detector circuit is coupled to the peak detector circuit and used for generating a plurality of first parameters for phase shift and amplitude losses according to different cable length. An internal pattern calibration circuit is multiplexed to the first signal and used for generating a plurality of second parameters for calibration of close loop. A feedback control circuit connected to the equalizer core circuit is used for continuously fine tuning of the equalizer core circuit according to the first parameters and the second parameters. A clock generator circuit connected to the feedback control circuit is used for data recovery and parameter calibration of open loop.

Figure 1:
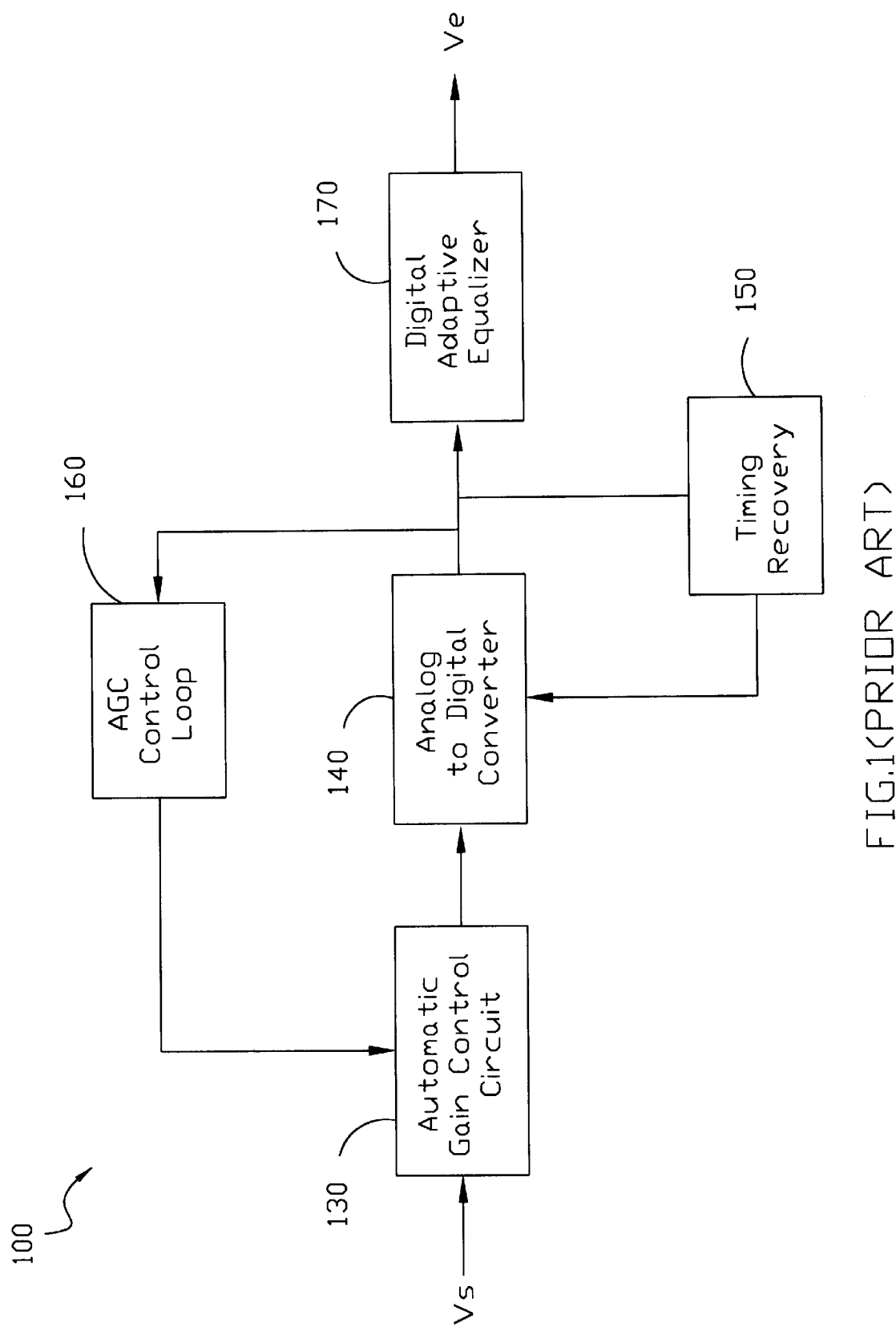
FIG. 1 is a block diagram illustrating an equalizer in accordance with one method of a prior art.
Figure 2:
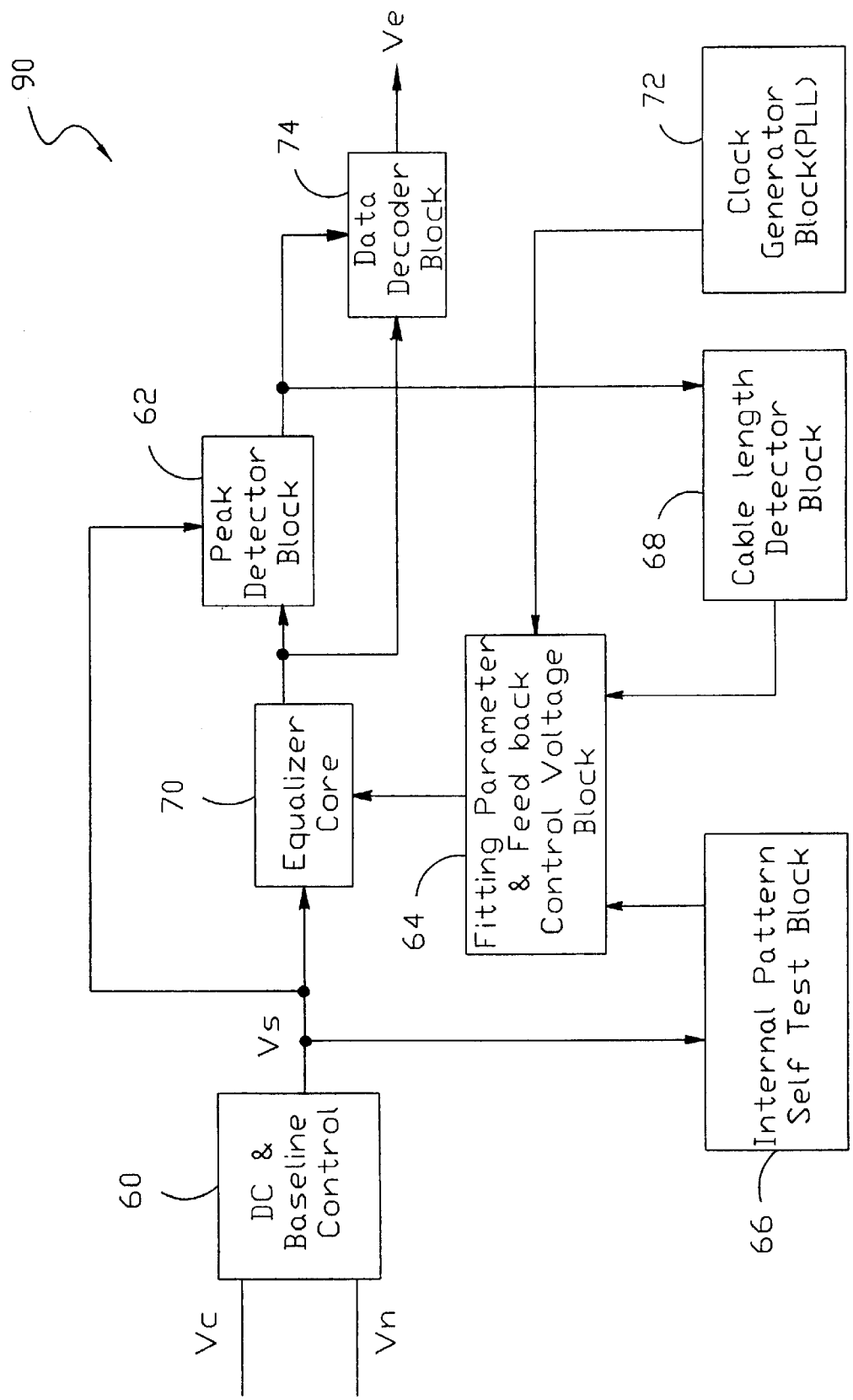
FIG. 2 is a block diagram illustrating an equalizer in accordance with the method of the present invention.

Referring to FIG. 2 is a block diagram of a data communication system illustrating connection of the transmission line length estimation circuit 90 of the present invention. The differential signal components $V_c$ and $V_N$ derived from a transmission line (not shown) are inputted into a DC and baseline control 60. A DC bias circuitry is included in the DC and base line control 60 for assuring the differential signal components $V_c$ and $V_N$ received to a desired common mode DC voltage level. The DC voltage level $V_s$ is subsequently transmitted into a peak detector circuit 62 during length estimation stage, and is transmitted to an equalizer core circuit 70 during close loop control stage. In the present invention, the peak detector circuit 62 is also coupled to an output from the equalizer core 70. The equalizer core 70 generates fine parameters used for compensation for the RC time constant of the transmission line.

Furthermore, The DC voltage level $V_s$ is also used to bias an internal pattern and self-test circuit 66 for calibration of close loop. A cable length detector circuit 68 receiving the output of the peak detector circuit 62 is also used for generating some parameters for a feedback control circuit 64. On the other hand, the VCO control voltage of the clock generator circuit 72 is also coupled to the feedback control circuit 64 and used for the calibration of open loop. The feedback control circuit 64 that is coordinated with the internal pattern and self-test circuit 66, the cable length detector circuit 68 and the VCO control voltage of the clock generator circuit 72, can generate multitudes of fitting parameters for adjusting the characteristics of the equalizer core circuit 70. With the cooperation of those circuits, the equalizer for the transmission line length is capable of auto-calibration and self-test, and viewed as a continuous feedback equalizer. Of course, a data decoder circuit 74 is coupled to the peak detector circuit 62 and the output from the equalizer core circuit 70 and output a MLT3 format signal $V_e$.

Figure 3:
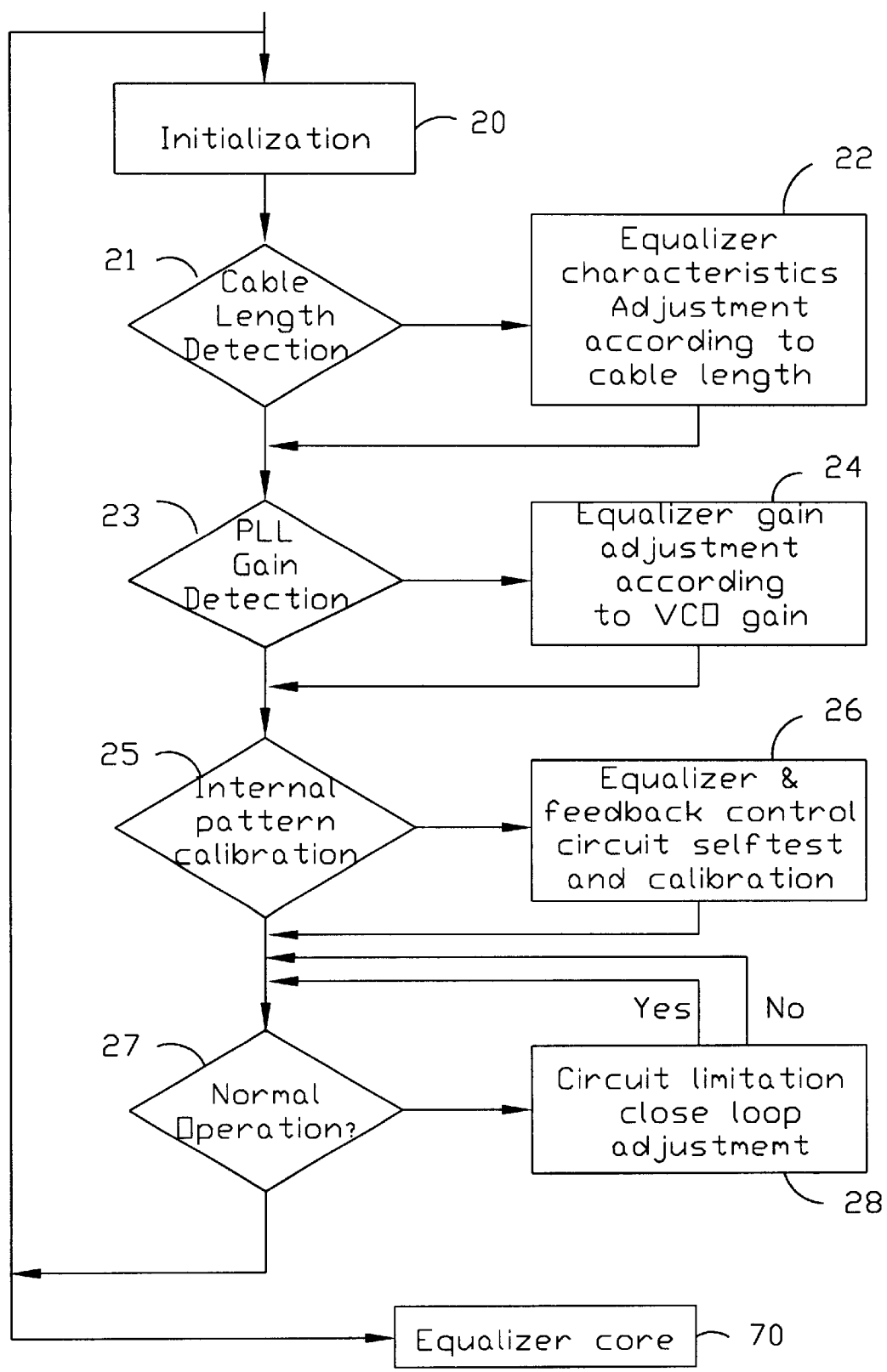
FIG. 3 is a flow chart illustrating an equalizer with auto-calibration and self-test in accordance with the present invention.

The present invention provides the continuous feedback equalizer circuit for continuous auto-calibration and self-test. FIG. 3 shows a control flow of the auto-calibration and self-test for the transmission line length estimation circuit 90. First, the output signal from the DC and baseline control is through initialization (step 20) to load default values. The cable length detector circuit receives the signal after initialization and generates multitude of adjusting parameters (step 21). Then the equalizer core circuit adjusts the equalizer characteristics in accordance with the adjusting parameters generated by the cable length detector circuit (step 22). On the other hand, the addition of the PLL gain circuit can calibrate for an open loop (step 23), and a voltage from voltage control oscillator (VCO) in the PLL gain circuit also can be used to adjust the equalizer gain (step 24). Furthermore, with addition of internal pattern calibration for close loop (step 25), the equalizer core circuit and the feedback control circuit are enable to implement the self-test and auto-calibration (step 26). When the equalizer is through normal operation (step 27), the circuit limitation is implemented with close loop adjustment (step 28) and the gain is incremented if the EQ gain is too small, otherwise the gain is remained. A series of parameters are generated for fine tuning of the feedback control and then transmitted into the equalizer core circuit for continuous feedback control.

There are many advantages for the present invention. First, a fine curve for any signal with the discontinuous points can be tuned out through the continuous feedback control circuit. Second, the equalizer system of the present invention is applied to a cable with long length, such as longer than 120 meter without precision parameters fitting for the equalizer that looses the design for the equalizer. Third, the fine curve (continuous curve) is further tuned by the internal pattern calibration. Furthermore, the addition of self-test can reduce the problem of the mass production because it is difficult to get the dynamic transferred curve of the calibration in short time during the mass production. In the present invention, many gain curves dependent to frequencies and amplitudes are generated by the self-test step and further reduces the process variation issues.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A transmission line length estimation circuit with continuous feedback equalizer, said transmission line length estimation circuit comprising:

a direct-current (DC) bias circuit and a peak detector circuit for generating a direct-current voltage according to a cable length, said peak detector circuit used for a first signal in first time and a second signal in second time;

an equalizer core circuit for receiving said first signal and generating said second signal;

a transmission line length detector circuit coupled to said peak detector circuit, said transmission line length detector circuit for generating a plurality of first parameters for phase shift and amplitude losses according to said cable length;

an internal pattern calibration circuit multiplexed to said first signal, said internal pattern calibration circuit for generating a plurality of second parameters for calibration of close loop; and a feedback control circuit connected to said equalizer core circuit, said feedback control circuit for continuously fine tuning of said equalizer core circuit according to said first parameters and said second parameters.

2. The transmission line length estimation circuit of claim 1 further comprising:

a clock generator circuit connected to said feedback control circuit, said clock generator circuit for data recovery and parameter calibration of open loop; and a data decoder coupled to said peak detector circuit and said equalizer core circuit.

3. The transmission line length estimation circuit of claim 1, wherein said internal pattern calibration circuit is further used for a self-test for said equalizer core circuit.

4. The transmission line length estimation circuit of claim 1, wherein said feedback control circuit is further used for auto-calibration for said equalizer core circuit.

5. The transmission line length estimation circuit of claim 1, wherein said first time is through a stage of length estimation.

6. The transmission line length estimation circuit of claim 1, wherein said second time is through a stage of close loop control.

7. An equalizer with auto calibration and self-test, said equalizer comprising:

a direct-current (DC) bias circuit and a peak detector circuit for generating a direct-current voltage according to a cable length, said peak detector used for a first signal in first time and a second signal in second time;

an equalizer core circuit for receiving said first signal and generating said second signal;

a transmission line length detector circuit coupled to said peak detector circuit, said transmission line length detector circuit for generating a plurality of first parameters for phase shift and amplitude losses according to said cable length;

an internal pattern calibration circuit multiplexed to said first signal, said internal pattern calibration circuit for generating a plurality of second parameters for calibration of close loop;

a feedback control circuit connected to said equalizer core circuit, said feedback control circuit for continuously fine tuning of said equalizer core circuit according to said first parameters and said second parameters; and a clock generator circuit connected to said feedback control circuit, said clock generator circuit used for data recovery and parameter calibration of open loop.

8. The equalizer of claim 7, wherein said internal pattern calibration circuit is further used for a self-test for said equalizer core circuit.

9. The equalizer of claim 7, wherein said feedback control circuit is further used for auto-calibration for said equalizer core circuit.

10. The equalizer of claim 7, wherein said first time is through a stage of length estimation.

11. The equalizer of claim 7, wherein said second time is through a stage of close loop control.

* * * * *